United States Patent

[11] 3,581,849

| [72] | Inventor | Richard E. Landgraf<br>South Bend, Ind. |
|---|---|---|
| [21] | Appl. No. | 867,202 |
| [22] | Filed | Oct. 17, 1969 |
| [45] | Patented | June 1, 1971 |
| [73] | Assignee | The Bendix Corporation |

[54] AUTOMATIC BRAKE ADJUSTER MECHANISM
11 Claims, 3 Drawing Figs.

[52] U.S. Cl................................................. 188/196,
188/71.8, 188/351
[51] Int. Cl................................................. F16d 65/74
[50] Field of Search............................................ 188/71.8,
79.5 GE, 196 A, 152.13, 351; 60/54.5, 65

[56] References Cited
UNITED STATES PATENTS
2,429,023  10/1947  Hunt .......................... 188/196(P)UX
2,928,246  3/1960  Sjodin ........................ 188/196(A)UX
3,125,187  3/1964  Dotto ......................... 188/196(A)X

*Primary Examiner*—Duane A. Reger
*Attorneys*—William N. Antonis and Plante, Arens, Hartz, Smith and Thompson

ABSTRACT: An automatic brake-adjuster mechanism for use with an aircraft disc brake wherein a self-contained sealed hydraulic device is utilized to determine the released position of the pressure plate. The device includes a cylinder which is connected to the pressure plate and functions as a positioning member, and a piston located within the cylinder which is part of and functions as a follower member having a limited amount of movement. The cylinder contains a constant volume of incompressible fluid which is permitted to flow from one side of the piston to the other side thereof, by a check valve located in the piston, when the cylinder moves relative to the piston.

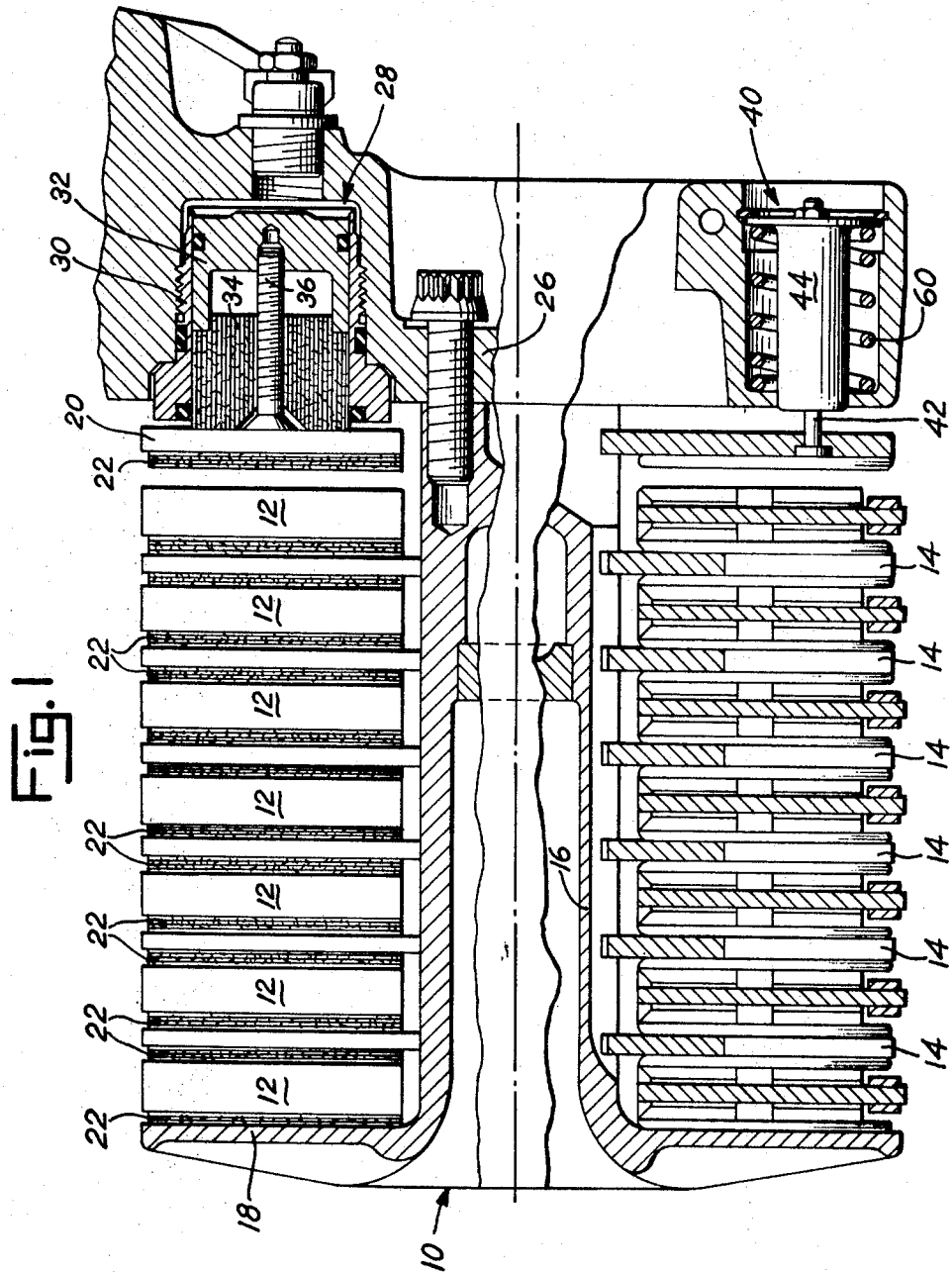

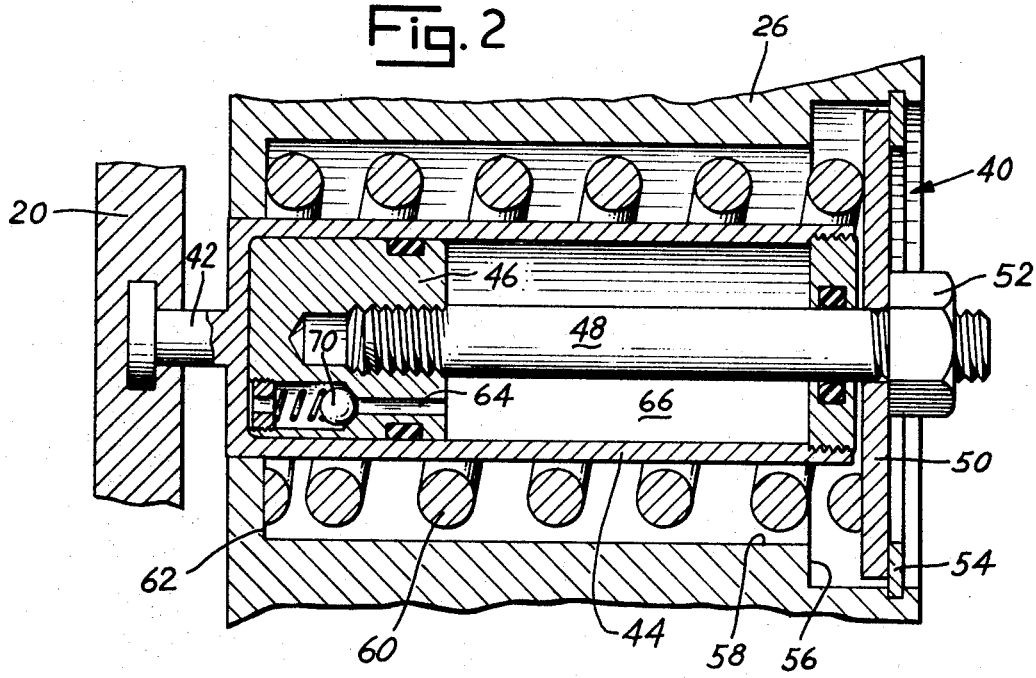
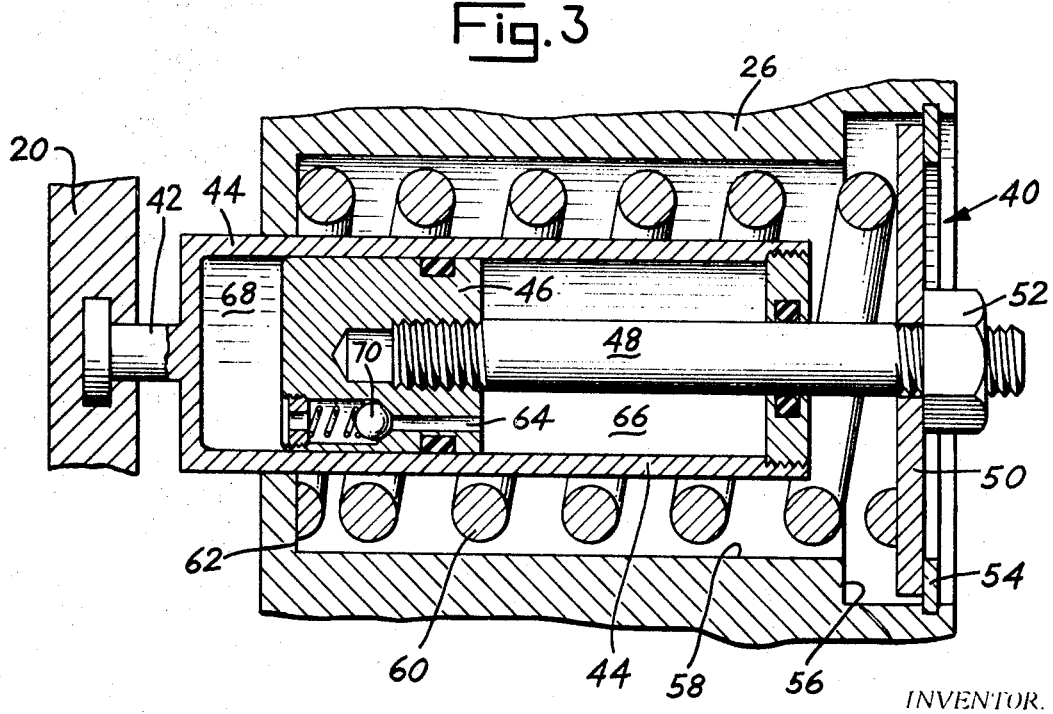

AUTOMATIC BRAKE ADJUSTER MECHANISM

BACKGROUND OF THE INVENTION

In the construction of the typical disc-type brake there is provided a number of interleaved rotor and stator members, some of which are lined with suitable friction materials. At one side of the "stack" of rotors and stators is a fixed backing plate against which the stack of rotors and stators is compressed and at the opposite side of the stack is a pressure plate which bears against the stack of rotors and stators and presses them together and against the backing plate. The rotors, stators and pressure plate are all axially movable to permit their interengagement. Since the pressure plate has maximum axial movement, adjustment of the released position of this plate is, in effect, an adjustment of the brake as a whole.

SUMMARY OF THE INVENTION

Accordingly, it is an object of this invention to provide a brake adjuster mechanism which will automatically adjust the position of the pressure plate for the next brake application.

Another object of this invention is to provide an automatic brake-adjuster mechanism which will be more efficient and reliable in operation and more simple in construction than comparable type mechanisms.

A further object of this invention is to provide an automatic brake-adjuster mechanism which adjusts the pressure plate in infinite and perceptible steps.

A still further object of this invention is to provide an automatic brake-adjuster mechanism which utilizes the principle of a progressively lengthening fluid link.

The above and other objects and features of the invention will become apparent from the following description of the mechanism taken in connection with the accompanying drawings.

BRIEF DESCRIPTION OF THE DRAWINGS

FIG. 1 is a fragmentary axial sectional view taken through a disc brake incorporating the invention;

FIG. 2 is an enlarged sectional view of the automatic brake-adjuster mechanism shown in FIG. 1 with the pressure plate shown in its original position; and FIG. 3 is a sectional view similar to that of FIG. 2 with the pressure plate shown in an adjusted position after the brake has been in use for an extended period.

DESCRIPTION OF THE PREFERRED EMBODIMENT

Referring to FIG. 1 it will be seen that the numeral 10 designates generally an aircraft brake of the disc-type construction. The brake consists of a plurality of interleaved rotors 12 which are splined to and are rotated by the aircraft wheel (not shown) and stators 14 which are splined to a nonrotatable torque tube 16. Both the rotors and stators are movable axially and are sometimes referred to as a brake "stack." It is the frictional engagement of these relatively rotatable rotors and stators which produces the breaking action on the aircraft. At one side of the stack is an upturned flange 18 of the torque tube 16 which is hereinafter referred to as a backing plate. At the other side of the stack is a pressure plate 20, the purpose of which is to clamp the rotors 12 and stators 14 together by thrusting at one side of the stack and biasing the entire stack against the backing plate 18.

Pressure plate 20, each of the stators 14 and the backing plate 18 have frictional material lining 22 suitably attached thereto. The lining is often formed in segments and is individually attached by rivets or the like to its associated mounting structure. Neither the composition, arrangement nor mounting of the friction segments forms an essential part of the present invention.

Adjacent the pressure plate 20 is a carrier plate 26 which is connected to the axle (not shown) through any suitable means. The carrier contains a plurality of fluid motors 28 (only one of which is shown) each of which includes a protective sleeve 30 threaded to the carrier and a piston 32 located and slidable in the sleeve. A block of insulating material 34 is secured to the head end of the piston by a threaded pin 36 for protecting the hydraulic brake fluid from the heat generated during braking.

Also mounted on the carrier plate 26 are a plurality of automatic brake-adjuster mechanisms designated generally by reference numeral 40. Each adjuster mechanism includes a positioning device comprising a positioning pin 42 which is suitably secured to the pressure plate 20 and a positioning cylinder 44 which contains a constant volume of incompressible fluid therein. The adjuster mechanism also includes an axially movable follower device which comprises a piston 46 located within the cylinder 44 in sealing engagement therewith, a piston rod 48 extending from the piston and a washer 50 which is retained on the end of the piston rod by a nut 52. The washer 50 limits the movement of the follower device between a first fixed stop means formed by a retaining ring 54 and a second fixed stop means formed by a shoulder 56 of bore 58. A return spring 60 is located in the bore 58 and is compressed between the washer 50 and a second shoulder 62 formed in the bore 50. Located in the piston is a passage 64 for permitting flow of fluid from one side of the piston to the other side thereof that is from chamber 66 to chamber 68 of the cylinder. A check valve 70 is located in the piston passage to prevent return flow from chamber 68 to chamber 66.

Referring to FIGS. 2 and 3, wherein the adjuster mechanism of FIG. 1 is more clearly illustrated, it will be seen that upon movement of the pressure plate 20 through actuation of the fluid motors 28, the fluid like formed by the constant volume of incompressible fluid within the cylinder will permit concomitant and equal axial movement of the cylinder 44 and the piston 46 during the brake application until the washer 50 has moved from the first stop 54 to the second stop 56 at which time continued independent axial movement of the pressure plate and cylinder will cause the cylinder to slide with respect to the piston of the spring follower so that the axial relationship between the pressure plate 20 and the follower device will be properly adjusted for the next brake application. More specifically, after the washer has abutted the shoulder 56 of the carrier, continued movement of the pressure plate will result in a pressure buildup in the chamber 66 of the cylinder thereby causing fluid to flow past the check valve 70 into chamber 68, thus lengthening the fluid link or assembly to compensate for lining wear.

Thus, the running clearance, that is, the amount of the return travel of the pressure plate 20 after release of the braking force is determined by the available travel of the spring follower between the first and second stops 54 and 56, respectively. Therefore, as the braking components wear, the pressure plate travel will be able to exceed that which is available to the spring follower. This difference in travel is permitted by the relative movement between the cylinder 44 and the piston 46 which occurs when the fluid flows from chamber 66 to chamber 68. Upon release of the braking pressure the return spring 60 will retract the pressure plate only the distance which the spring follower can move from the second stop 56 to the first stop 54. In this manner the mechanism automatically provides the necessary brake clearance.

From the foregoing it will be apparent that the adjuster mechanism described herein has an unlimited life. Furthermore, the only servicing required is the bleeding of fluid from chamber 68 to chamber 66 to permit piston 46 to return to its original position. The only replacement parts necessary would be O-rings. However, such O-rings need not be replaced at each bleeding, but only when they are condemned by an inspector. In addition, since the adjuster is sealed, it will be impervious to environmental conditions. Furthermore, since friction has been eliminated as a means for producing an erratic adjustment, the described adjustment which is metered will produce a more stable adjustment.

However, practical advantages in addition to the foregoing which flow from the above-described simple, compact, unitary adjustable mechanism are believed to be obvious and other advantages may suggest themselves to those who are familiar with the art to which this invention relates.

Furthermore, although this invention has been described in connection with a specific embodiment, it will be obvious to those skilled in the art that various changes may be made in the form, structure and arrangement of components without departing from the spirit of the invention.

Having thus described the various features of the invention what I claim as new and desire to secure by Letters Patent is:

1. In a brake having an axially fixed member and an axially movable member which moves a distance at least partially dependent upon the amount of brake wear, an automatic adjuster mechanism for automatically changing the released position of said axially movable member to maintain a predetermined brake clearance comprising axially extending positioning means secured to said axially movable member, first and second fixed stop means operatively connected to said fixed member, follower means axially movable between said first and second stop means, resilient means compressed between said follower means and fixed abutment means carried by said fixed member, first and second variable volume chamber means formed by said positioning means and said follower means for defining fluid like means, said fluid like means having a constant volume of incompressible fluid divided between said first and second chamber means for permitting concomitant and equal axial movement of said positioning means and said follower means during a brake application until said follower means has moved from said first to said second stop means, and valve means operatively connected to said positioning and follower means for permitting independent axial movement of said positioning means relative to said follower means thereafter by allowing flow of fluid from said first chamber means to said second chamber means but preventing reverse flow therebetween, said fluid in said second chamber means being trapped therein by said valve means so that the axial relationship between said positioning means and said follower means will be changed for the next brake application.

2. The structure, as defined in claim 1, wherein said positioning means includes a cylinder member and said follower means includes a piston member located therein and in sealing engagement therewith.

3. The structure, as defined in claim 2, wherein said first chamber means is located within said cylinder member and on one side of said piston member and said second chamber means is located within said cylinder member and on the other side of said piston member.

4. The structure, as defined in claim 3, wherein said valve means is located in one of said cylinder and piston members.

5. The structure, as defined in claim 4, wherein said valve means is located in said piston member.

6. The structure, as defined in claim 5, wherein said valve means is a check valve which upon fluid flow from said first chamber means to said second chamber means traps fluid in said second chamber means.

7. The structure, as defined in claim 6, wherein said follower means includes a piston rod connected to said piston member which extends exteriorly of said cylinder member and a contact member connected to said piston rod which limits movement of said follower means between said first and second stop means.

8. The structure, as defined in claim 7, wherein said resilient means is a return spring which is confined between the fixed abutment means of said fixed member and said contact member.

9. The structure, as defined in claim 8, wherein said contact member is a washer which is retained on said piston rod.

10. The structure, as defined in claim 9, wherein said washer is retained on said piston rod by a nut threaded thereon.

11. In a brake having an axially fixed member and an axially movable member which moves a distance at least partially dependent upon the amount of brake wear, an automatic-adjuster mechanism for automatically changing the released position of said axially movable member to maintain a predetermined brake clearance comprising axially extending positioning means secured to said axially movable member, said positioning means including a cylinder member, first and second fixed stop means operatively connected to said fixed member, axially movable spring follower means, said follower means including a piston member located within said cylinder member in sealing engagement therewith and having a piston rod extending therefrom with a washer retained on the end thereof, said washer being adapted to limit movement of said follower means between said first and second stop means, fluid link means located within said cylinder member and having a constant volume of incompressible fluid for permitting concomitant and equal axial movement of said positioning means and said follower means during a brake application until said washer has moved from said first to said second stop means, said fluid link means including a first variable volume chamber located on one side of said piston member and a second variable volume chamber located on the other side of said piston member, and valve means located in said piston member for permitting independent axial movement of said positioning means relative to said follower means thereafter by allowing fluid flow from said first chamber means to said second chamber means and then trapping said fluid in said second chamber means so that the axial relationship between said positioning means and said follower means will be changed for the next brake application.